United States Patent
Fan (10) Patent No.: US 9,338,683 B2
(45) Date of Patent: May 10, 2016

(54) METHOD, USER EQUIPMENT AND BASE STATION DEVICE FOR TRANSMITTING INDICATION INFORMATION

(71) Applicant: Huawei Technologies Co., Ltd., Shenzhen, Guangdong (CN)

(72) Inventor: Shuju Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 14/146,250

(22) Filed: Jan. 2, 2014

(65) Prior Publication Data

US 2014/0112186 A1 Apr. 24, 2014

Related U.S. Application Data

(63) Continuation of application No. PCT/CN2012/078142, filed on Jul. 4, 2012.

(30) Foreign Application Priority Data

Jul. 6, 2011 (CN) .......................... 2011 1 0188365

(51) Int. Cl.
*H04W 24/10* (2009.01)
*H04L 1/16* (2006.01)
*H04L 1/00* (2006.01)

(52) U.S. Cl.
CPC ............. *H04W 24/10* (2013.01); *H04L 1/0026* (2013.01); *H04L 1/0027* (2013.01); *H04L 1/1685* (2013.01)

(58) Field of Classification Search
CPC ... H04W 24/10; H04L 1/0026; H04L 1/0027; H04L 1/1685
USPC ......... 370/229, 230, 231, 235, 241, 252, 276, 370/277, 278, 310, 328, 338; 455/7, 24
See application file for complete search history.

(56) References Cited

U.S. PATENT DOCUMENTS

2003/0087605 A1 5/2003 Das et al.
2008/0101280 A1 5/2008 Gholmieh et al.
(Continued)

FOREIGN PATENT DOCUMENTS

| CN | 101060389 A | 10/2007 |
|---|---|---|
| CN | 101193421 A | 6/2008 |
| CN | 101300881 A | 11/2008 |
| CN | 101601216 A | 12/2009 |
| CN | 101677261 A | 3/2010 |

(Continued)

OTHER PUBLICATIONS

"3GPP TS 25.214—3rd Generation Partnership Project; Technical Specification Group Radio Access Network; Physical layer procedures (FDD) (Release 10)," Version 10.3.0, 3rd Generation Partnership Project, Valbonne, France (Jun. 2011).

*Primary Examiner* — Obaidul Huq
(74) *Attorney, Agent, or Firm* — Leydig, Voit & Mayer, Ltd.

(57) ABSTRACT

A method, a user equipment, and a base station device for transmitting indication information. A method comprises: initially setting an indication information feedback mode of a user equipment to a deactivation state, where the user equipment in the deactivation state does not transmit indication information to a base station; after receiving an indication information feedback request transmitted by a network side, setting the indication information feedback mode of the user equipment to an activation state, where the user equipment in the activation state uses an indication information feedback cycle to transmit the indication information to the base station. Embodiments of the present disclosure initially set a user equipment to a deactivation state of not transmitting indication information to the base station, set a user equipment to an activation state of transmitting indication information when a network side has transmitted an indication information feedback request, reducing unnecessary uplink indication information feedback.

17 Claims, 4 Drawing Sheets

(56) References Cited

U.S. PATENT DOCUMENTS

| | | |
|---|---|---|
| 2008/0261530 A1 | 10/2008 | Gerstenberger et al. |
| 2009/0163199 A1 | 6/2009 | Kazmi et al. |
| 2009/0209256 A1 * | 8/2009 | Nakashima et al. .......... 455/436 |
| 2011/0021230 A1 | 1/2011 | Moberg et al. |

FOREIGN PATENT DOCUMENTS

| | | |
|---|---|---|
| CN | 101729114 A | 6/2010 |
| CN | 101904194 A | 12/2010 |
| CN | 101983488 A | 3/2011 |
| CN | 101998634 A | 3/2011 |

\* cited by examiner

FIG. 11

METHOD, USER EQUIPMENT AND BASE STATION DEVICE FOR TRANSMITTING INDICATION INFORMATION

CROSS-REFERENCE TO RELATED APPLICATIONS

This application is a continuation of International Patent Application No. PCT/CN2012/078142, filed on Jul. 4, 2012, which claims priority to Chinese Patent Application No. 201110188365.8, filed on Jul. 6, 2011, both of which are hereby incorporated by reference in their entireties.

TECHNICAL FIELD

Embodiments according to the present disclosure relate to the field of wireless communications, more particularly to a method, a user equipment, and a base station device for transmitting indication information.

BACKGROUND

Along with fast development of communications technologies, as one mainstream technology for the third generation of mobile communications system, wideband code division multiple access (Wideband Code Division Multiple Access, WCDMA) has been in extensive research and use worldwide. High speed downlink packet access (High Speed Downlink Packet Access, HSDPA) is introduced in a Rel-5 version drawn up by the third generation partnership project (3rd Generation Partnership Project, 3GPP) so as to accelerate the downlink data transmission rate.

In HSDPA technology, a NodeB (NodeB) transmits data to a user equipment (User Equipment, UE) via a high speed downlink shared channel (High Speed Downlink Shared Channel, HS-DSCH) in physical layer, meanwhile transmits a control signaling associated with the HS-DSCH etc. via a high speed physical downlink shared control channel (High Speed Physical Downlink Shared Control Channel, HS-SCCH). Upon receiving the HS-SCCH, the UE uses control information carried thereon to perform demodulation, decoding and etc. on the HS-DSCH, then according to receiving status of the HS-SCCH and whether or not the HS-DSCH is decoded correctly, the UE generates acknowledgement (Acknowledgment, ACK)/negative acknowledgement (negative acknowledgement, NACK) information. Moreover, the UE also measures the downlink channel condition and generates a channel quality indicator (Channel Quality Indicator, CQI); if the current network has configured multiple-input multiple-output (Multiple-Input Multiple-Output, MIMO) for the UE, the UE also need to generate a pre-coding control indicator (Pre-coding Control Indicator, PCI). The UE carries ACK/NACK information, CQI information and PCI information (the UE need not to feed back a PCI until the network has configured MIMO) on a HS-DPCCH channel, and transmits it to a NodeB. The NodeB regards the feedback information by the UE as factors of service scheduling.

Feedback modes of CQI and PCI information are controlled by higher layer configuration parameters: where a CQI feedback cycle (k) and a CQI repetition factor (N_cqi_transmit) respectively control a CQI/PCI feedback cycle and repetitive transmitting times of the CQI/PCI within one cycle. Once the network has configured these parameters for the UE, the UE shall transmit the CQI/PCI according to the mode designated by the network and according to protocol.

The current protocol might result in certain problems. For example, there are no scheduling data for a UE over an relatively long time period, however, the UE still feeds back CQI periodically; and in fact, during the time period when the network does not schedule data for the UE, the reported CQI is of no value, only the latest CQI to scheduling data is valuable.

SUMMARY

Embodiments according to the present disclosure provide a method, a user equipment, and a base station device for transmitting indication information, thus being able to reduce unnecessary indication information feedback.

According to one aspect a method for transmitting indication information includes: initially setting an indication information feedback mode of a user equipment to a deactivation state, where the user equipment in the deactivation state does not transmit indication information to a base station; and after receiving an indication information feedback request transmitted by a network side, setting the indication information feedback mode of the user equipment to an activation state, where the user equipment in the activation state uses an indication information feedback cycle to transmit the indication information to the base station.

According to another aspect, a method for transmitting indication information includes: transmitting an indication information feedback request to a user equipment so that an indication information feedback mode of the user equipment is set to an activation state, where the indication information feedback mode of the user equipment is initially set to a deactivation state, and where the user equipment in the deactivation state does not transmit indication information to a base station, and the user equipment in the activation state uses an indication information feedback cycle to transmit the indication information to the base station.

According to another aspect, a method for transmitting indication information includes: receiving a feedback cycle adjustment request transmitted by a base station; and adjusting an indication information feedback cycle of a user equipment according to the feedback cycle adjustment request.

According to another aspect, a method for transmitting indication information includes: monitoring an uplink load in a cell; and transmitting a feedback cycle adjustment request to a user equipment according to the uplink load so that the user equipment adjusts the indication information feedback cycle of the user equipment according to the feedback cycle adjustment request.

According to another aspect, a method for transmitting indication information includes: adjusting an indication information feedback cycle of a user equipment according to whether or not receiving downlink data from a base station during a consecutive time period.

According to another aspect, a user equipment includes: a setting unit, configured to initially set an indication information feedback mode of a user equipment to a deactivation state, where the user equipment in the deactivation state does not transmit indication information to a base station; and a state changing unit, configured to, when receiving an indication information feedback request transmitted by a network side, set the indication information feedback mode of the user equipment to an activation state where the user equipment in the activation state transmits the indication information to the base station.

According to another aspect, a base station device includes: a generating unit, configured to generate an indication information feedback request; and a transmitting unit, configured to transmit to a user equipment the indication information feedback request generated by the generating unit, so that an indication information feedback mode of the user equipment is set to an activation state, where the indication information feedback mode of the user equipment is initially set to a deactivation state, and where the user equipment in the deactivation state does not transmit indication information to a base station, and the user equipment in the activation state uses an indication information feedback cycle to transmit the indication information to the base station.

According to another aspect, a user equipment includes: a receiving unit, configured to receive a feedback cycle adjustment request transmitted by a base station; and an adjustment unit, configured to adjust an indication information feedback cycle of the user equipment according to the feedback cycle adjustment request received by the receiving unit.

According to another aspect, a base station device includes: a monitoring unit, configured to monitor an uplink load of a cell; and a request unit, configured to transmit a feedback cycle adjustment request to a user equipment according to the uplink load monitored by the monitoring unit, so that the user equipment adjusts the indication information feedback cycle of the user equipment according to the feedback cycle adjustment request.

According to another aspect, a user equipment includes: a storage unit, configured to store an indication information feedback cycle of the user equipment; and an adjustment unit, configured to adjust an indication information feedback cycle of the user equipment stored by the storage unit according to whether or not receiving downlink data from a base station.

In the embodiments according to the present disclosure, a user equipment is initially set to a deactivation state of not transmitting indication information to a base station, and when a network side transmits an indication information feedback request, the user equipment is set to an activation state of transmitting the indication information, thus reducing an unnecessary uplink indication information feedback.

BRIEF DESCRIPTION OF DRAWINGS

In order to illustrate the technical solution of the embodiments of the present disclosure more clearly, drawings needed for describing the embodiments and the prior art are briefly introduced hereinafter. Apparently, the drawings being described hereinafter are only some embodiments of the present disclosure, and persons having ordinary skill in the art may still derive other drawings from the accompanying drawings without creative efforts.

DESCRIPTION OF EMBODIMENTS

The following clearly and comprehensively describes the technical solutions in embodiments of the present disclosure with reference to the accompanying drawings of embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The technology solution of the present disclosure may be applied in a variety of communications systems, such as a global system of mobile communication (GSM, Global System of Mobile communication), a code division multiple access (CDMA, Code Division Multiple Access) system, a wideband code division multiple access (WCDMA, Wideband Code Division Multiple Access Wireless), a general packet radio service (GPRS, General Packet Radio Service), a long term evolution (LTE, Long Term Evolution), etc.

A user equipment (UE, User Equipment) may also be named a mobile terminal (Mobile Terminal), a mobile user equipment, etc. which can communicate with one or more core networks via a radio access network (for example, RAN, Radio Access Network). The user equipment may be a mobile terminal, such as a mobile phone (or named "cellular" phone), and a computer with mobile terminal, such as a portable, mini, handheld, built-in, or vehicle-mounted mobile device, which exchange voice and/or data with a radio access network.

A base station may be a base transceiver station (BTS, Base Transceiver Station) in GSM or CDMA, or may be a nodeB (NodeB) in WCDMA, or may be an evolutional node B (eNB or e-NodeB, evolutional Node B) in LTE which will not be limited in the present disclosure. However, for the purpose of simplified description, the embodiments hereinafter shall be illustrated by taking NodeB as an example.

Indication information may be CQI, or CQI and PCI (in an MIMO scenario). For the purpose of simplified description, the embodiments hereinafter shall be illustrated by taking CQI as an example.

Figure 1:
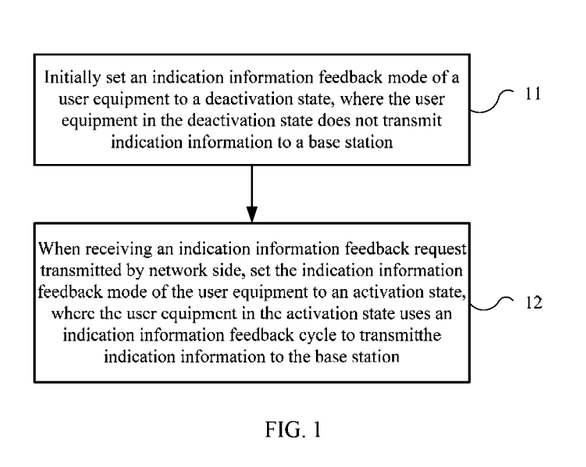
FIG. 1 is a flow diagram of a method for transmitting indication information according to an embodiment of the present disclosure.

FIG. 1 is a flow diagram of a method for transmitting indication information according to an embodiment of the present disclosure. The method according to FIG. 1 is executed by a user equipment (for example, a UE).

At step 11, initially set an indication information feedback mode of a user equipment to a deactivation state, where the user equipment in the deactivation state does not transmit indication information to a base station.

At step 12, when receiving an indication information feedback request transmitted by network side, set the indication information feedback mode of the user equipment to an activation state, where the user equipment in the activation state uses an indication information feedback cycle to transmit the indication information to the base station.

In the embodiment of the present disclosure, a user equipment is initially set to be in a deactivation state of not transmitting indication information to a base station; when a network side transmits an indication information feedback request, the user equipment is set to be in an activation state of transmitting the indication information, thus reducing an unnecessary uplink indication information feedback.

Figure 2:
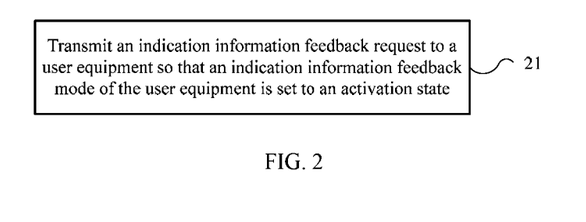
FIG. 2 is a flow diagram of a method for transmitting indication information according to another embodiment of the present disclosure.

FIG. 2 is a flow diagram of a method for transmitting indication information according to another embodiment of the present disclosure. The method in FIG. 2 is executed by a network side device (for example, a NodeB), and is in correspondence with the method in FIG. 1.

At step 21, transmit an indication information feedback request to a user equipment so that an indication information feedback mode of the user equipment is set to an activation state, where the indication information feedback mode of the user equipment is initially set to a deactivation state, and where the user equipment in the deactivation state does not transmit indication information to a base station, and the user equipment in the activation state uses an indication information feedback cycle to transmit the indication information to the base station.

In the embodiment of the present disclosure, a user equipment is initially set to be in a deactivation state of not transmitting indication information to a base station; when a network side transmits an indication information feedback request, the user equipment is set to be in an activation state of transmitting the indication information, thus reducing an unnecessary uplink indication information feedback.

In addition, after the indication information feedback mode of the user equipment is set to the activation state, if neither receiving downlink data nor receiving an indication information feedback request transmitted by the network side during a consecutive first time period T1, an indication information feedback mode of a user equipment may reenter into the deactivation state and reactivate when receiving a next indication information feedback request.

Figure 3:
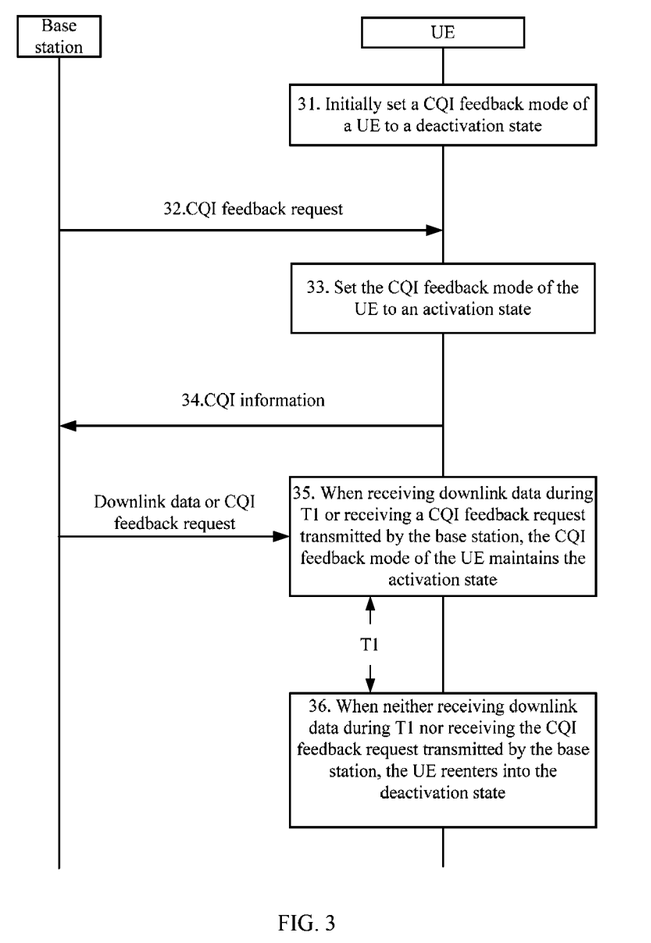
FIG. 3 is a schematic flow diagram of a CQI feedback process according to an embodiment of the present disclosure.

FIG. 3 is a schematic flow diagram of a CQI feedback process according to an embodiment of the present disclosure.

At step 31, a CQI feedback mode of a UE is initially set to a deactivation (deactivation) state.

The UE can perform the above initial setting according to its own configuration, for example, the UE can directly set the CQI feedback mode to be the deactivation state when starting up. Or else, the UE can perform the above initial setting according to network configuration, for example, when a base station configures HSDPA for the UE, the base station can indicate the UE to initially set the CQI feedback mode to the deactivation state. Under the deactivation state, the UE is not required to report CQI information.

At step 32, when needing to schedule data for the UE, a base station transmits to the UE a CQI feedback request to activate the UE to transmit a CQI.

At step 33, upon receiving the CQI feedback request transmitted by the base station, the UE switches to a CQI feedback activation state. The CQI feedback request may either be explicit or implicit. For example, the CQI feedback request may be a dedicated signaling issued by the base station, or the CQI feedback request may be included in other messages. Alternatively, the UE may believe the base station transmits a CQI feedback request when detecting a control channel HS-SCCH.

At step 34, the user equipment in the activation state transmits CQI information to the base station according to a CQI feedback cycle.

The CQI feedback cycle used by the UE may be a CQI feedback cycle k initially configured by the network. Or else, it may be a CQI feedback cycle $k_p$ after one or more adjustments.

At step 35, after the UE has been set to the activation state, if it can receive downlink data transmitted by the base station or the CQI feedback request transmitted by the base station during a consecutive first time period T1, the UE maintains the activation state.

At step 36, if the UE has not received downlink data and the CQI feedback request transmitted by the base station during the consecutive first time period T1, it will stop transmitting CQI information and reenter into a CQI deactivation state.

Henceforth, if the UE once again receives the CQI feedback request transmitted by the base station, the above process of steps 32-36 is repeated.

Therefore, in the embodiment of the present disclosure, a user equipment is initially set to a deactivation state of not transmitting indication information to a base station; when a network side transmits an indication information feedback request, the user equipment is set to an activation state of transmitting indication information, thus reducing an unnecessary uplink indication information feedback. In addition, the UE being in a deactivation state does not report a CQI, thus being conducive to the UE power saving meanwhile reducing an uplink load.

The foregoing describes embodiments regarding changing the activation state of the indication information feedback mode. The embodiments of the present disclosure may also realize the reduction of an uplink CQI feedback by adjusting an indication information feedback cycle of a user equipment.

In a network, each cell can simultaneously serve a plurality of UEs. The network can respectively configure parameters for UEs supporting the HSDPA capability. Once the UEs are configured with parameters, each UE will perform a CQI/PCI report in accordance with a mode configured by the network. When the number of UEs increases in a cell, the total power of the network receiving the uplink control channel (DPCCH, HS-DPCCH) of each UE in the cell is continue to increase, which will occupy an available resource being reserved for uplink data transmission. Because each cell's uplink load (total receiving power of the cell on a network side) cannot exceed a target load value, exceeding the target load may result in negative effects over service quality for UEs.

In a condition that the uplink load is heavy, in order to most effectively perform the uplink data transmission, it is imperative to squeeze some resources for data transmission by reducing the uplink control channel transmission. Because what the DPCCH transmits is a pilot signal, a basis for other uplink channels to normally demodulate and decode, the pilot signal must be transmitted generally. However, the HS-DPCCH is a feedback for a downlink channel quality, and its feedback cycle can be adjusted.

At present, when a network's uplink load is comparatively heavy in a cell (e.g., greater than a given threshold), if a UE is required to change a feedback mode (a parameter), the network must perform parameter reconfiguration for the UE, such as a mode of increasing a CQI feedback cycle so as to reduce the uplink load, thus guaranteeing uplink data transmission as much as possible. Nevertheless, parameter reconfiguration takes comparatively lengthy time—usually about several hundred milliseconds, which is comparatively long in contrast to the minimum scheduling cycle 2 ms for HSDPA, therefore it is difficult to carry out real-time control over the load.

A user equipment according to the embodiment of the present disclosure can implement the feedback cycle adjustment of the user equipment according to a feedback cycle adjustment request issued by a base station, or based on whether or not downlink data from a base station are received during a consecutive time period (a second time period T2), thus in no need of parameter reconfiguration.

Figure 4:
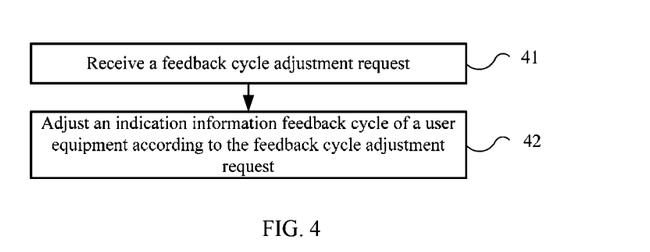
FIG. 4 is a flow diagram of a method for transmitting indication information according to another embodiment of the present disclosure.

FIG. 4 is a flow diagram of a method for transmitting indication information according to another embodiment of the present disclosure. The method according to FIG. 4 is executed by a user equipment (e.g., a UE). In the embodiment of FIG. 4, a user equipment adjusts an indication information feedback cycle according to a feedback cycle adjustment request issued by a base station.

At step 41, receive a feedback cycle adjustment request.

An indication information feedback cycle of a UE is initially configured as an indication information feedback cycle k configured by a network. Nevertheless, by transmitting a feedback cycle adjustment request, a NodeB can change the indication information transmission cycle being actually used by a UE physical layer as $k_p$. The feedback cycle adjustment request can indicate the UE to increase the indication information feedback cycle, decrease the indication information feedback cycle, or reset the information feedback cycle (reset to the indication information feedback cycle k configured by the network), etc.

At step 42, adjust the indication information feedback cycle of the user equipment according to the feedback cycle adjustment request.

When adjusting the indication information feedback cycle of the user equipment, it is capable of multiplying the indication information feedback cycle by $2^n$, or increasing or reducing the indication information feedback cycle to a specific value, where n is a non-zero integer. In other words, when n is a positive integer, the indication information feedback cycle increases; when n is a negative integer, the indication information feedback cycle reduces.

In addition, an value obtained by multiplying the indication information feedback cycle by $2^n$ or the above specific value must be within an optional set, and the optional set includes an optional value of the indication information feedback cycle, for example, $\{0, 2, 4, 8, 16, 32, 64\} \cup \{10, 20, 40, 80, 160\}$. In the case that if current feedback cycle continues to increase it will exceed the optional set, the feedback cycle can be maintained to be the current value. The reduction of the feedback cycle is similar.

In this embodiment, a user equipment adjusts an indication information feedback cycle according to a feedback cycle adjustment request of a base station, thus the indication information feedback cycle can be controlled flexibly according to the network schedule.

The following gives an example: suppose a CQI feedback cycle k=4 ms, to increase the cycle means to increase the CQI feedback cycle to 2 times the original ($k_p:=2\times k_p$), and to decrease the cycle means to decrease the CQI feedback cycle to ½ of the original ($k_p:=k_p/2$); a cycle reset means to set the CQI feedback cycle to a network configuration value ($k_p:=k$).

The aforementioned adjustment process of an indication information feedback cycle may be implemented several times as needed. The adjustment of an indication information feedback cycle may be used in conjunction with an indication information feedback mode of a user equipment (an activation state or a deactivation state). Under such circumstances, a base station transmits a feedback cycle adjustment request to a user equipment so that a user equipment adjusts an indication information feedback cycle. When the user equipment enters into the activation state, it can transmit indication information to a base station by using the adjusted feedback cycle.

For example, no matter a UE is either in a CQI feedback activation state or a deactivation state, a NodeB can issue a CQI feedback cycle adjustment request, once having received the request, the UE updates to a feedback cycle $k_p$. When entering into the activation state, the UE transmits a CQI by using a feedback cycle $k_p$.

The feedback cycle adjustment request transmitted to a user equipment by a base station can be transmitted based on an uplink load of a cell being monitored by the base station.

Figure 5:
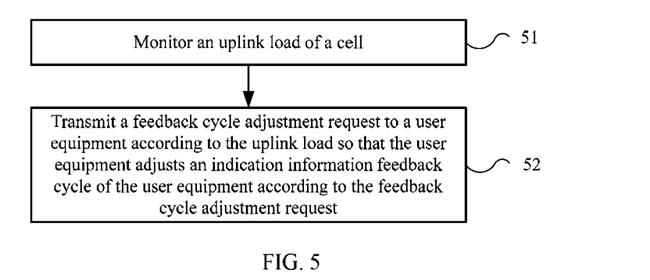
FIG. 5 is a flow diagram of a method for transmitting indication information according to another embodiment of the present disclosure.

FIG. 5 is a flow diagram of a method for transmitting indication information according to another embodiment of the present disclosure. The method according to FIG. 5 is executed by a base station (e.g., a NodeB).

At step 51, monitor an uplink load of a cell.

At step 52, transmit a feedback cycle adjustment request to a user equipment according to the uplink load so that the user equipment adjusts the indication information feedback cycle of the user equipment according to the feedback cycle adjustment request.

According to the embodiment, a base station monitor the uplink load in the cell in real time, requests a user equipment to adjust an indication information feedback cycle according to the uplink load, thus the indication information feedback cycle can be controlled flexibly according to the network schedule.

Optionally, according to an embodiment, a NodeB monitors an uplink load of a cell in real time. When the uplink load exceeds a first threshold or a remaining uplink resource of the uplink load is less than the uplink transmission demand, transmit a feedback cycle adjustment request to a user equipment so that the user equipment can increase its indication information feedback cycle according to the feedback cycle adjustment request. Alternatively, when the uplink load is less than a second threshold, transmit a feedback cycle adjustment request to a user equipment so that a user equipment can reduce its indication information feedback cycle according to the feedback cycle adjustment request. The aforementioned first threshold and second threshold can be preset values. The modes of increasing or reducing the indication information feedback cycle by the user equipment can refer to the embodiment in FIG. 4, hence will not be detailed here.

Optionally, in another embodiment, a base station can set priorities for a plurality of user equipments. When it is required to increase an indication information feedback cycle of a user equipment, the feedback cycle adjustment request can be transmitted to one or more user equipments in sequence according to an increasing order of the user equipments' priorities, until the uplink load is less than or equal to the first threshold or the remaining uplink resource of the uplink load exceeds or is equal to an uplink transmission requirement, i.e., until satisfying existing uplink data transmission demand.

Furthermore, when it is required to reduce an indication information feedback cycle of a user equipment, the feedback cycle adjustment request can be transmitted to one or more user equipments in sequence according to a decreasing order of the user equipments' priorities, until the uplink load exceeds or is equal to the second threshold.

As a result, the embodiment of the present disclosure can increase or reduce the indication information feedback cycle according to the network scheduling demand, so as to obtain balance on uplink and downlink throughput capability.

With reference to FIG. 4 and FIG. 5, the embodiments according to which a user equipment adjusts an indication information feedback cycle according to a feedback cycle adjustment request issued by a base station have been described above. The user equipment in the embodiments of the present disclosure may also carry out an adaptive adjustment of a feedback cycle.

Figure 6:
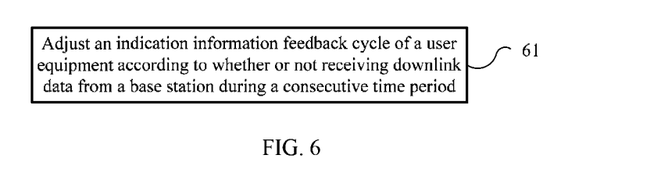
FIG. 6 is a flow diagram of a method for transmitting indication information according to another embodiment of the present disclosure.

FIG. 6 is a flow diagram of a method for transmitting indication information according to another embodiment of the present disclosure. The method according to FIG. 6 is executed by a user equipment (e.g., a UE) to realize an adaptive adjustment of a feedback cycle.

At step 61, adjust an indication information feedback cycle of a user equipment according to whether or not receiving downlink data from a base station during a consecutive time period.

According to the embodiment, the user equipment adjusts its indication information feedback cycle according to the receiving condition of downlink data during a consecutive time period, so as to adaptively and flexibly control the indication information feedback mode according to the downlink traffic condition.

Optionally, in an embodiment, how to adjust an indication information feedback cycle can be determined according to a length of the consecutive time period prior to receiving the downlink data. For example, upon having received the downlink data, if the length of the consecutive time period prior to receiving the downlink data is less than T3, reset the indication information feedback cycle to an initial set value k or reduce the indication information feedback cycle; if the length of the consecutive time period prior to receiving downlink data exceeds T4, increase the indication information feedback cycle; if the length of the consecutive time period prior to receiving the downlink data exceeds or equals T3 and is less than or equals T4, maintain the current indication information feedback cycle. Here, T3<=T4 (i.e., T3 is less than or equal to T4).

Although the aforementioned describes an example of maintaining the current indication information feedback cycle under a condition where the length of the consecutive time period prior to receiving the downlink data equals T3 or T4, the embodiments of the present disclosure are not limited hereof. For example, when the aforementioned length of the consecutive time period equals T3, it is possible to use the same adjustment mode as when it is less than T3, i.e., reset the indication information feedback cycle to the initial set value k or reduce the indication information feedback cycle. Alternatively, when the aforementioned length of the consecutive time period equals T4, it is possible to use the same adjustment mode as when it exceeds T4, i.e., increase the indication information feedback cycle. These combinations all fall within the scope of the embodiments of the present disclosure.

Under the condition where T3=T4, the operation of maintaining the current indication information feedback cycle is not an option. In other words, when not receiving downlink data from a base station during a consecutive time period T3, increase the indication information feedback cycle. Alternatively, when receiving downlink data from the base station during the aforementioned consecutive time period T3, reset the indication information feedback cycle to the initial set value k or reduce the indication information feedback cycle. The modes of increasing or reducing the indication information feedback cycle by a user equipment can refer to the embodiment in FIG. 4, thus will not be detailed here. For example, when increasing a CQI feedback cycle, the CQI feedback cycle can be increased to $2^n$ times the original or to a specific value.

Optionally, the aforementioned consecutive time period T3 or T4 is adjustable. For example, the consecutive time period T3 or T4 can be adjusted according to the current indication information feedback cycle. Specifically, the consecutive time period T3 or T4 may be integer times of the current indication information feedback cycle (including the current indication information feedback cycle), or may be a time period by increasing or reducing a preset length of time, such as 2 ms. Through automatically adjusting the CQI feedback cycle, a match between the CQI feedback cycle and data scheduling ratio can be realized automatically, an unnecessary CQI feedback is avoided, thus being conducive to UE power saving and reducing the uplink load of the cell.

The embodiment according to FIG. 6 can be employed in combination with the embodiment according to FIG. 1. Under such circumstances, a UE can adaptively adjust a CQI feedback cycle. After a UE has entered into an activation state, it uses the adjusted CQI feedback cycle to transmit the CQI information to a base station.

Figure 7:
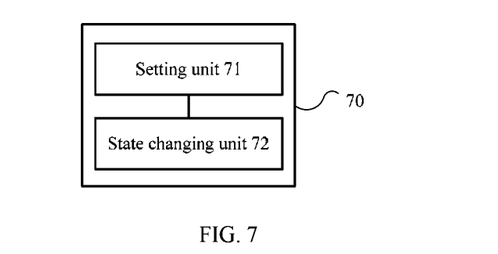
FIG. 7 is a schematic block diagram of a user equipment according to an embodiment of the present disclosure.

FIG. 7 is a schematic block diagram of a user equipment according to an embodiment of the present disclosure. The user equipment 70 according to FIG. 7 includes a setting unit 71 and a state changing unit 72.

The setting unit 71 initially sets an indication information feedback mode of a user equipment to a deactivation state, where the user equipment in the deactivation state does not transmit indication information to a base station. The state changing unit 72 sets the indication information feedback mode of the user equipment to an activation state when receiving an indication information feedback request transmitted by a network side, where the user equipment in the activation state transmits the indication information to the base station.

The embodiment according to the present disclosure initially sets the user equipment to the deactivation state of not transmitting indication information to a base station, and sets the user equipment to the activation state of transmitting indication information when a network side transmits an indication information feedback request, thus reducing an unnecessary uplink indication information feedback.

The aforementioned indication information is a CQI, or a CQI and a PCI.

Optionally, in an embodiment, when, neither downlink data are received nor an indication information feedback request transmitted by the network side is received during a consecutive first time period after the indication information feedback mode of the user equipment is set to the activation state, the state changing unit 72 sets the indication information feedback mode to the deactivation state.

Figure 8:
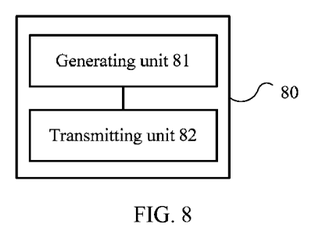
FIG. 8 is a schematic block diagram of a base station device according to an embodiment of the present disclosure.

FIG. 8 is a schematic block diagram of a base station device according to an embodiment of the present disclosure. The base station device 80 according to FIG. 8 includes a generating unit 81 and a transmitting unit 82.

The generating unit 81 generates an indication information feedback request. The transmitting unit 82 transmits to a user equipment the indication information feedback request generated by the generating unit 81, so that the indication information feedback mode of the user equipment is set to an activation state, where the indication information feedback mode of the user equipment is initially set to a deactivation state, and where the user equipment in the deactivation state does not transmit indication information to the base station, and the user equipment in the activation state uses an indication information feedback cycle to transmit the indication information to the base station.

The embodiment according to the present disclosure initially sets a user equipment to a deactivation state of not transmitting indication information to a base station, sets a user equipment to an activation state of transmitting indication information when a network side transmits an indication information feedback request, thus reducing an unnecessary uplink indication information feedback.

The aforementioned indication information is a CQI, or a CQI and a PCI.

Figure 9:
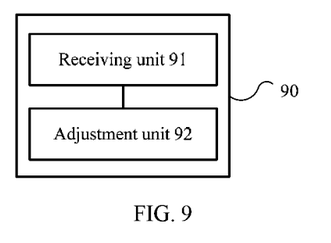
FIG. 9 is a schematic block diagram of a user equipment according to another embodiment of the present disclosure.

FIG. 9 is a schematic block diagram of a user equipment according to another embodiment of the present disclosure. The user equipment according to FIG. 9 includes a receiving unit 91 and an adjustment unit 92.

The receiving unit 91 receives a feedback cycle adjustment request transmitted by a base station. The adjustment unit 92 adjusts an indication information feedback cycle of the user equipment according to the feedback cycle adjustment request received by the receiving unit.

According to the embodiment, a user equipment adjusts an indication information feedback cycle according to a feedback cycle adjustment request of a base station, thus being capable of flexibly controlling the indication information feedback cycle according to network scheduling.

The aforementioned indication information is a CQI, or a CQI and a PCI.

Figure 10:
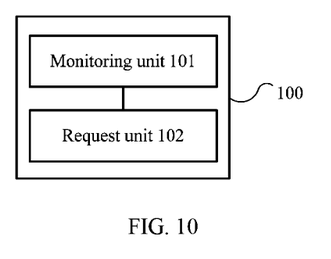
FIG. 10 is a schematic block diagram of a base station device according to another embodiment of the present disclosure.

FIG. 10 is a schematic block diagram of a base station device according to another embodiment of the present disclosure. The Base station device 100 according to FIG. 10 includes a monitoring unit 101 and a request unit 102.

The monitoring unit 101 monitors an uplink load of a cell. The request unit 102 transmits a feedback cycle adjustment request to a user equipment according to the uplink load monitored by the monitoring unit 101, so that the user equipment adjusts an indication information feedback cycle of the user equipment according to the feedback cycle adjustment request.

According to the embodiment, a base station monitors an uplink load of a cell in real time, requests a user equipment to adjust an indication information feedback cycle according to the uplink load, thus being capable of flexibly controlling the indication information feedback cycle according to network scheduling.

The aforementioned indication information is a CQI, or a CQI and a PCI.

Optionally, according to an embodiment, when an uplink load exceeds a first threshold or a remaining uplink resource of an uplink load is less than an uplink transmission demand, the request unit 102 transmits a feedback cycle adjustment request to a user equipment so that the user equipment can increase its indication information feedback cycle according to the feedback cycle adjustment request. Alternatively, when the uplink load is less than a second threshold, the request unit 102 transmits the feedback cycle adjustment request to the user equipment so that the user equipment can reduce its indication information feedback cycle according to the feedback cycle adjustment request. The request unit 102 can select one or a plurality of user equipments, to which a feedback cycle adjustment request needs to be transmitted, according to the priority of the user equipment, as the method of the embodiment in FIG. 5.

Figure 11:
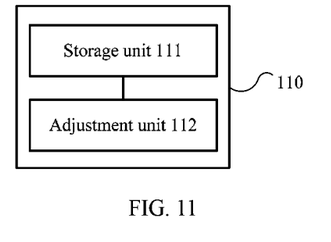
FIG. 11 is a schematic block diagram of a user equipment according to another embodiment of the present disclosure.

FIG. 11 is a schematic block diagram of a user equipment according to another embodiment of the present disclosure. The user equipment 110 according to FIG. 11 includes a storage unit 111 and an adjustment unit 112.

The storage unit 111 stores an indication information feedback cycle of the user equipment. The adjustment unit 112 adjusts the indication information feedback cycle of the user equipment stored by the storage unit 111 according to whether or not downlink data from a base station are received.

According to the embodiment, the user equipment adjusts its indication information feedback cycle according to the receiving condition of downlink data during a consecutive time period, so as to adaptively and flexibly control a indication information feedback mode according to the downlink service condition.

The aforementioned indication information is a CQI, or a CQI and a PCI.

Optionally, in an embodiment, the adjustment unit 112 increases the indication information feedback cycle when not receiving downlink data from the base station during the consecutive time period; or resets the indication information feedback cycle to an initial setting value or reduces the indication information feedback cycle when receiving downlink data from the base station during the consecutive time period.

In addition, according to demand, the aforementioned user equipments can be employed in combination. For example, a user equipment 70 can combine the adjustment unit 92 in FIG. 9 and/or the adjustment unit 112 in FIG. 11. The aforementioned base station devices can also be employed in combination. For example, the base station device 100 can combine the generating unit 81 and the transmitting unit 82 in FIG. 8. These amendments all fall within the scope according to the embodiments of the present disclosure.

A communications system according to the embodiments of the present disclosure can include the aforementioned user equipments 70, 90, 110, or the aforementioned base station devices 80, 100.

A person having ordinary skill in the art may realize that each exemplified unit and algorithm step described in conjunction with the disclosed embodiments in the specification can be carried out by electronic hardware, computer software, or the combination of the two. In order to clearly set forth the interchangeability between hardware and software, the aforementioned description has generally described the components and steps of each example according to functions. Whether these functions are carried out with hardware or software lies in the specific application and design constraint conditions of the technical solution. For each specific application, a technology professional can employ different methods to implement the described functions, however, such implementations cannot be considered going beyond the scope of the present disclosure.

A person having ordinary skill in the art can clearly understand that, for the purpose of convenient and concise description, regarding the aforementioned specific working process of the system, device and unit set forth, it is possible to refer to the corresponding process of the aforementioned method embodiments, thus, it will not be detailed here.

According to several embodiments provided by the present application, it is understood that the disclosed system, device and method can be implemented by other means. For example, the aforementioned device embodiments are merely schematic, e.g., the partition of the units are solely logical function partitions, when being implemented in practice, there may be other partition means, such as a plurality of units or components can be combined or be integrated into another system, or some features can be ignored or are not executed. Another point is, the disclosed or discussed couplings, direct couplings or communication connections between one and another may be indirect couplings or communication connections via some interfaces, devices, or units; they may be in an electrical form, a mechanical form, or other forms.

The units illustrated as separated components may or may not be physically separated, and the disclosed components as units may or may not be physical units, i.e., they may be located at one place, or may be distributed to a plurality of network units. It is possible to select part of or all units thereof to meet the ends of the solutions of the embodiments in view of actual demand.

Moreover, in each embodiment of the present disclosure, each function unit can be integrated into one processing unit, each unit can be physically existed separately, or two or more than two units are integrated into one unit. The above integrated units can be implemented either in a hardware form or in a software function unit form.

The integrated units can be stored in a computer readable storage medium, if they can be implemented in a software function unit form and be sold or used as individual products. In view of such understanding, technical solutions by the present disclosure essentially, parts contributing to the prior art, or all or part of the technical solutions can be rendered in a software product form. The computer software product is stored in a storage medium, comprising many instructions configured to enable one computer device (which can be a personal computer, a server, a network device, etc) to execute all or part of steps of the method according to each embodiment of the present disclosure. The aforementioned storage medium includes: media capable of storing programming codes such as a USB disk, a mobile hard drive, a read-only memory (ROM, Read-only Memory), a random access memory (RAM, Random Access Memory), a magnetic disk, or a optical disc.

The aforementioned is merely the embodiments of the present disclosure, however, the protection scope of the present disclosure is not limited thereto, changes or substitutes easily conceived by any person having ordinary skill in the art, within the technical scope disclosed by the present disclosure, shall fall within the protection scope of the present disclosure. Therefore, the protection scope of the present disclosure shall be based on the protection scope of the claims thereof.

What is claimed is:

1. A method for transmitting indication information, comprising:
    initially setting an indication information feedback mode of a user equipment to a deactivation state, wherein the user equipment in the deactivation state does not transmit indication information to a base station;
    after receiving an indication information feedback request transmitted by a network side, setting the indication information feedback mode of the user equipment to an activation state; and
    transmitting the indication information to the base station, by the user equipment in the activation state, using an indication information feedback cycle;
    further comprising:
    adjusting, by the user equipment, the indication information feedback cycle according to a feedback cycle adjustment request transmitted by the base station, or according to whether downlink data is received from the base station during a consecutive time period after setting the indication information feedback mode of the user equipment to the activation state;
    wherein the transmitting the indication information to the base station, by the user equipment in the activation state, using the indication information feedback cycle, comprises transmitting the indication information to the base station, by the user equipment in the activation state, using the adjusted indication information feedback cycle;
    wherein the adjusting the indication information feedback cycle comprises:
    multiplying the indication information feedback cycle by $2^n$, or increasing or reducing the indication information feedback cycle to a designated value, wherein n is a non-zero integer, and wherein a value obtained by multiplying the indication information feedback cycle by $2^n$ or the designated value is within an optional set, and the optional set comprises an optional value of the indication information feedback cycle.

2. The method according to claim 1, wherein the indication information is a channel quality indicator (CQI), or the indication information comprises the CQI and a pre-coding control indicator (PCI).

3. The method according to claim 1, further comprising:
    if, during a first time period after setting the indication information feedback mode of the user equipment to the activation state, downlink data is received or the indication information feedback request transmitted by the network side is received, maintaining the user equipment in the activation state; or
    if, during the first time period after setting the indication information feedback mode of the user equipment to the activation state, neither the downlink data nor the indication information feedback request transmitted by the network side is received, setting the indication information feedback mode to the deactivation state.

4. A method for transmitting indication information, comprising:
    transmitting an indication information feedback request to a user equipment, which causes an indication information feedback mode of the user equipment to be set to an activation state, wherein the indication information feedback mode of the user equipment is initially set to a deactivation state, and the user equipment in the deactivation state does not transmit indication information to a base station; and
    transmitting the indication information to the base station, by the user equipment in the activation state, using an indication information feedback cycle;
    further comprising:
    transmitting a feedback cycle adjustment request to the user equipment so that the user equipment adjusts the indication information feedback cycle,
    wherein the user equipment in the activation state transmitting the indication information to the base station comprises transmitting the indication information to the base station, by the user equipment in the activation state, using an adjusted feedback cycle;
    wherein the transmitting to the user equipment the feedback cycle adjustment request comprises:
    monitoring an uplink load of a cell; and
    transmitting the feedback cycle adjustment request to the user equipment according to the uplink load;
    wherein the transmitting the feedback cycle adjustment request to the user equipment according to the uplink load comprises:
    when the uplink load exceeds a first threshold, or a remaining uplink resource of the uplink load is less than an uplink transmission requirement, transmitting the feedback cycle adjustment request to the user equipment so that the user equipment increases the indication information feedback cycle of the user equipment according to the feedback cycle adjustment request; or when the uplink load is less than a second threshold, transmitting the feedback cycle adjustment request to the user equipment so that the user equipment reduces the indication information feedback cycle of the user equipment according to the feedback cycle adjustment request.

5. The method according to claim 4, wherein the indication information is a channel quality indicator (CQI), or the indication information comprises the CQI and a pre-coding control indicator (PCI).

6. The method according to claim 4, further comprising:
setting priorities of a plurality of user equipments,
wherein the transmitting the feedback cycle adjustment request to the user equipment so that the user equipment increases the indication information feedback cycle of the user equipment according to the feedback cycle adjustment request comprises: transmitting in sequence, according to an increasing order of the priorities of the plurality of user equipments, the feedback cycle adjustment request to one or more user equipments until the uplink load is less than or equal to the first threshold or the remaining uplink resource of the uplink load exceeds or is equal to the uplink transmission requirement.

7. The method according to claim 4, further comprising:
setting priorities of a plurality of user equipments,
wherein the transmitting the feedback cycle adjustment request to the user equipment so that the user equipment reduces the indication information feedback cycle of the user equipment according to the feedback cycle adjustment request comprises:
transmitting in sequence, according to a decreasing order of the priorities of the plurality of user equipments, the feedback cycle adjustment request to one or more user equipments until the uplink load exceeds or is equal to the second threshold.

8. A user equipment, comprising:
a setting unit, configured to initially set an indication information feedback mode of a user equipment to a deactivation state, wherein the user equipment in the deactivation state does not transmit indication information to a base station; and
a state changing unit, configured to, after receiving an indication information feedback request transmitted by a network side, set the indication information feedback mode of the user equipment to an activation state, wherein the user equipment in the activation state transmits the indication information to the base station;
wherein the user equipment further comprises:
a receiving unit, configured to receive a feedback cycle adjustment request transmitted by the base station; and
an adjustment unit, configured to adjust an indication information feedback cycle of the user equipment according to the feedback cycle adjustment request received by the receiving unit, wherein the user equipment in the activation state uses an adjusted indication information feedback cycle to transmit the indication information to the base station;
the adjustment unit, further configured to multiply the indication information feedback cycle by $2^n$, or increase or reduce the indication information feedback cycle to a designated value, wherein n is a non-zero integer, and wherein a value obtained by multiplying the indication information feedback cycle by $2^n$ or the designated value is within an optional set, and the optional set comprises an optional value of the indication information feedback cycle.

9. The user equipment according to claim 8, wherein the state changing unit is further configured to: set the indication information feedback mode to the deactivation state after neither downlink data nor the indication information feedback request transmitted by the network side is received during a first time period after setting the indication information feedback mode of the user equipment to the active state.

10. A base station device, comprising:
a generating unit, configured to generate an indication information feedback request; and
a transmitting unit, configured to transmit to a user equipment the indication information feedback request generated by the generating unit, so that the indication information feedback mode of the user equipment is set to an activation state, wherein the indication information feedback mode of the user equipment is initially set to a deactivation state, and the user equipment in the deactivation state does not transmit indication information to a base station, and the user equipment in the activation state uses an indication information feedback cycle to transmit the indication information to the base station;
wherein the base station device further comprises:
a monitoring unit, configured to monitor an uplink load of a cell;
a request unit, configured to transmit a feedback cycle adjustment request to the user equipment according to the uplink load;
wherein the request unit is further configured to transmit the feedback cycle adjustment request to the user equipment when the uplink load exceeds a first threshold, or a remaining uplink resource of the uplink load is less than an uplink transmission requirement so that the user equipment increases the indication information feedback cycle of the user equipment according to the feedback cycle adjustment request or transmit the feedback cycle adjustment request to the user equipment when the uplink load is less than a second threshold so that the user equipment reduces the indication information feedback cycle of the user equipment according to the feedback cycle adjustment request.

11. The base station device according to claim 10, wherein the indication information is a channel quality indicator (CQI), or the indication information comprises the CQI and a pre-coding control indicator (PCI).

12. A method for transmitting indication information, comprising:
initially setting an indication information feedback mode of a user equipment to a deactivation state to not to transmit indication information to a base station;
after receiving an indication information feedback request transmitted by a network side, setting the indication information feedback mode of the user equipment to an activation state; and
adjusting, by the user equipment, an indication information feedback cycle by multiplying the indication information feedback cycle by $2^n$, wherein n is a non-zero integer, and wherein a value obtained by multiplying the indication information feedback cycle by $2^n$ is within an optional set, and the optional set comprises an optional value of the indication information feedback cycle;
transmitting the indication information to the base station, by the user equipment in the activation state, using the adjusted indication information feedback cycle.

13. The method according to claim 12, wherein the indication information feedback cycle is adjusted according to a feedback cycle adjustment request transmitted by the base station.

14. The method according to claim 12, wherein the indication information feedback cycle is adjusted according to whether downlink data is received from the base station during a consecutive time period after setting the indication information feedback mode of the user equipment to the activation state.

15. The method according to claim 12, wherein the indication information feedback cycle is adjusted by increasing or reducing the indication information feedback cycle to a designated value.

16. The method according to claim 15, wherein the designated value is within an optional set, and the optional set comprises an optional value of the indication information feedback cycle.

17. A method for transmitting indication information, comprising:
- transmitting an indication information feedback request to a user equipment, which causes an indication information feedback mode of the user equipment to be set to an activation state;
- receiving indication information from the user equipment in the activation state using an indication information feedback cycle;
- monitoring an uplink load of a cell; and
- when the uplink load exceeds a first threshold, or a remaining uplink resource of the uplink load is less than an uplink transmission requirement, transmitting a feedback cycle adjustment request to the user equipment, so that the user equipment increases the indication information feedback cycle of the user equipment according to the feedback cycle adjustment request;
- when the uplink load is less than a second threshold, transmitting the feedback cycle adjustment request to the user equipment, so that the user equipment reduces the indication information feedback cycle of the user equipment according to the feedback cycle adjustment request.

* * * * *